United States Patent [19]

Muething

[11] Patent Number: 4,660,979
[45] Date of Patent: Apr. 28, 1987

[54] METHOD AND APPARATUS FOR AUTOMATICALLY MEASURING SEMICONDUCTOR ETCHING PROCESS PARAMETERS

[75] Inventor: Kevin A. Muething, Hillsborough Township, Somerset County, N.J.

[73] Assignee: AT&T Technologies, Inc., Berkeley Heights, N.J.

[21] Appl. No.: 641,620

[22] Filed: Aug. 17, 1984

[51] Int. Cl.[4] .......................... G01B 9/02; G01B 11/02
[52] U.S. Cl. .................................... 356/357; 356/345; 356/355
[58] Field of Search ............... 356/345, 355, 357, 358, 356/359, 363, 381, 382, 72; 156/626

[56] References Cited

U.S. PATENT DOCUMENTS

| | | | |
|---|---|---|---|
| 3,612,692 | 10/1971 | Kruppa et al. | 356/357 |
| 3,720,471 | 3/1973 | Kasahara et al. | 356/357 |
| 4,176,961 | 12/1979 | Frazee et al. | 356/355 |
| 4,198,261 | 4/1980 | Busta et al. | 356/381 X |
| 4,381,894 | 5/1983 | Gogol et al. | 356/72 |
| 4,454,001 | 7/1984 | Sternheim et al. | 356/355 X |

FOREIGN PATENT DOCUMENTS

54-72679  1/1979  Japan .

OTHER PUBLICATIONS

Hopf, G., Kaus, G. and Kempf, J., "Optical Etch-Point Detection Using Chromatic Aberration," *IBM Technical Disclosure Bulletin,* vol. 26, No. 6, Nov. 1983, pp. 2780-2781.

Bayer, T., Elsner, G., Hinkel, H. and Kempf, J., "Interferometric Etch End-Point Detection for Two-Component Materials," *IBM Technical Disclosure Bulletin,* vol. 26, No. 2, Jul. 1983, pp. 688-689.

Greschner, J., Korth, H. E., Thiel, K. P. and Trumpp H., "Thin Film Monitor for in Situ Measuring of Silicon Etch Rates," *IBM Technical Disclosure Bulletin,* vol. 24, No. 9, Feb. 1982, pp. 4804-4805.

Manning, S. A. and Sherwood, E., "Algorithm for Etch End-Point Detection of Quartz Over Metal," *IBM Technical Disclosure Bulletin,* vol. 24, No. 12, May 1982, p. 6450.

*Primary Examiner*—Davis L. Willis
*Assistant Examiner*—S. A. Turner
*Attorney, Agent, or Firm*—R. B. Levy

[57] ABSTRACT

An apparatus for automatically measuring the depth and rate of etching of a semiconductor body (10) comprises an interferometer (18) and a counter circuit (28). The interferometer (18) directs light towards the semiconductor body (10) and detects the intensity of the light reflected therefrom which varies periodically during etching. The counter circuit (28) is responsive to the periodically varying intensity of the reflected light and automatically determines the number of cycles and the frequency thereof to compute the etch depth and etch rate therefrom.

14 Claims, 7 Drawing Figures

METHOD AND APPARATUS FOR AUTOMATICALLY MEASURING SEMICONDUCTOR ETCHING PROCESS PARAMETERS

TECHNICAL FIELD

This invention relates generally to a method for automatically measuring the depth and rate of etching of a semiconductor body.

BACKGROUND OF THE INVENTION

Semiconductor devices are generally fabricated from a wafer formed of a silicon substrate having an overlying, light transmissive thin film layer, such as $SiO_2$. During device fabrication, a coating of photoresist is applied over the light transmissive layer and then the photoresist is selectively exposed to light radiation either by contact or projection printing techniques. The unexposed portions of the photoresist are then removed, to leave a mask pattern on the light transmissive layer. The portions of the light transmissive layer not covered by the photoresist mask are then etched away to expose the silicon substrate therebeneath to form diffusion or contact windows to permit the creation of the desired device features. Etching may be accomplished by the use of acids or a reactive plasma.

In practice, etching of the wafer is usually monitored by a human operator. A technique presently used to allow manual determination of the depth and rate of etching to facilitate monitoring includes the step of directing a laser beam towards an area of the light transmissive layer not covered by the coating of photoresist. The light transmissive layer typically has an index of refraction between 1 and 2 so that the beam of light incident thereon is partially reflected at the surface thereof and is partially transmitted therethrough for reflection from the silicon substrate therebeneath. Because of the finite thickness of the light transmissive layer, there is a path length difference between the reflected beams, causing the beams to interfere.

During etching of the light transmissive layer, this path length difference changes, causing the composite intensity of the reflected, interfering beams to exhibit periodic maxima and minima. A detector detects the composite intensity of the beams and produces an output signal which varies accordingly. The detector output signal, which approximates a sinusoid during etching, is recorded by a strip chart recorder. The operator counts the number of cycles in the recorded sinusoid representing the variation over time of the beam intensity and manually computes the etch depth in accordance with this count. The period of the recorded sinusoid is then measured, and the frequency thereof is manually calculated. After the frequency has been calculated, the etch rate can be computed.

There are several disadvantages associated with manual determination of the etching process parameters in this fashion. Operator measurement of the number of cycles and the period of the sinusoid recorded by the strip chart recorder and subsequent computation of the depth and rate of etching, may result in error. Further, when many wafers are separately undergoing processing at the same time, as often occurs at many semiconductor manufacturing facilities, the time spent by the operator to individually calculate the etching parameters associated with each wafer may delay his or her performance of other tasks. For instance, while the operator is busy making the measurements and performing the calculations for one wafer, he or she may not be able to intercede during the etching of another wafer in a timely fashion in order to make whatever adjustments are required before too much material has been removed.

Accordingly, there is a need for a method for automatically measuring the semiconductor etching process parameters.

SUMMARY OF THE INVENTION

The aforementioned disadvantages are overcome in accordance with the method of the present invention. Light is directed towards a semiconductor body, formed of a substrate covered by a light transmissive layer, so that a beam is reflected from the light transmissive layer and from the substrate therebeneath. The thickness of the light transmissive layer causes a path length difference between the reflected beams, so that the beams interfere. During etching of the light transmissive layer, the path length difference changes, causing the intensity of the reflected, interfering beams to exhibit periodic maxima and minima. The composite intensity of the reflected, interfering beams is detected and a first electrical signal, which changes state in response to a minima or maxima of the composite beam intensity, is generated. A second electrical signal is generated so as to be phase shifted 90° from the first electrical signal. The first and second electrical signals are processed to determine the number of minima or maxima and the frequency of the composite beam intensity. The etch rate and the etch depth are then computed in accordance with the number of minima and maxima and the frequency, respectively, of the composite intensity.

The instant method affords the advantage that the etching process parameters can be accurately determined from the first and second electrical signals regardless of which quarter cycle of the beam intensity is used as the starting point. Moreover, the accuracy of the etching process parameters obtained from the first and second signals is not affected by any offset or bias present in the beam intensity.

DETAILED DESCRIPTION

Figure 1:
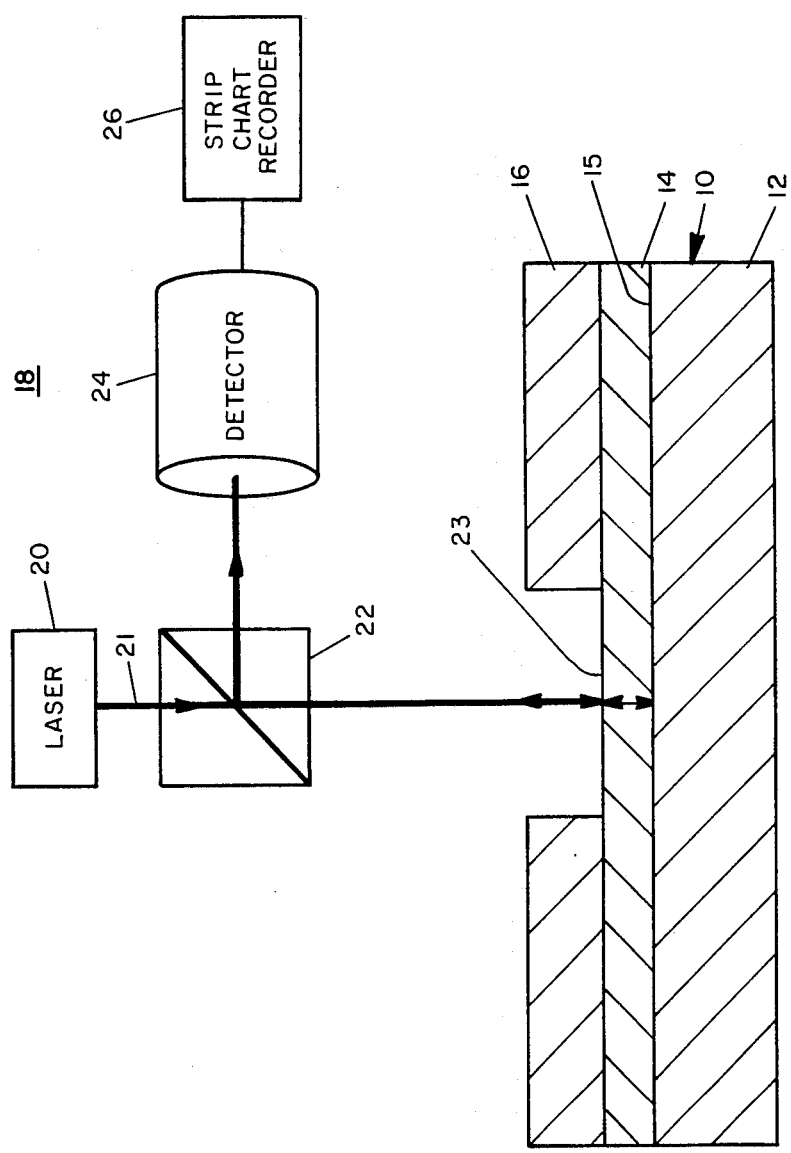
FIG. 1 illustrates a prior art laser interferometer for facilitating manual measurement of the etching process parameters of a semiconductor body.

FIG. 1 is a cross-sectional view, in elevation, of a portion of a semiconductor wafer 10 from which integrated circuits are fabricated. The semiconductor wafer 10 is typically comprised of a substrate 12, usually silicon, which has a light transmissive thin film layer 14, usually SiO$_2$, on its upper major surface 15. To facilitate the processing of the wafer 12, a coating of photoresist 16 is applied over selected portions of the light transmissive layer 14. The relative thicknesses of the light transmissive layer 14 and of the coating of photoresist 16 have been greatly exaggerated in FIG. for the purpose of illustration.

During the processing of the wafer 10, the portions of the light transmissive layer 14 not covered by the coating of photoresist 16 are etched away to expose the underlying substrate 12 in order to establish contact or diffusion windows (not shown) to which electrodes (not shown) may be attached. Etching may be achieved by several known methods including the use of a reactive plasma.

In the past, etching of the light transmissive layer 14 has been manually monitored with the aid of a single wavelength interferometer 18 whose construction is well known in the art. The interferometer 18 includes a laser 20, typically of the helium-neon (He-Ne) variety, which produces a light beam 21 that is directed vertically downwardly through a beamsplitter 22 towards a portion of the light transmissive layer 14 not covered by the coating of photoresist 16. Directing the beam 21 downwardly so that it is substantially perpendicular to the light transmissive layer 14 reduces the likelihood that the beam 21 will be scattered thereby.

A portion of the light beam 21 is reflected from the surface 23 of the light transmissive layer 14, whereas another portion of the beam passes therethrough and is reflected from the upper major surface 15 of the substrate 12. The beam reflected from the surface 23 of the light transmissive layer 14 is coincident with the beam which is reflected from the upper major surface 15 of the substrate 12 so that the two beams appear as one in FIG. 1. The coincident, reflected beams pass through the beamsplitter 22 into a detector 24. The detector 24 produces an output signal which varies in accordance with the combined composite intensity of the beams. The coincident beams interfere with each other because of the path length difference therebetween, owing to the finite thickness of the light transmissive layer 14. While the light transmissive layer 14 is undergoing etching, the path length difference between the beams continuously decreases. As a result of the changing path length difference, the composite intensity of the coincident, interfering beams is not constant but rather, exhibits periodic maxima and minima. Thus, the output signal of the detector 24, which is responsive to the beam intensity, will vary over time. To record the output signal of the detector 24, a strip chart recorder 26 is coupled thereto.

Figure 2:
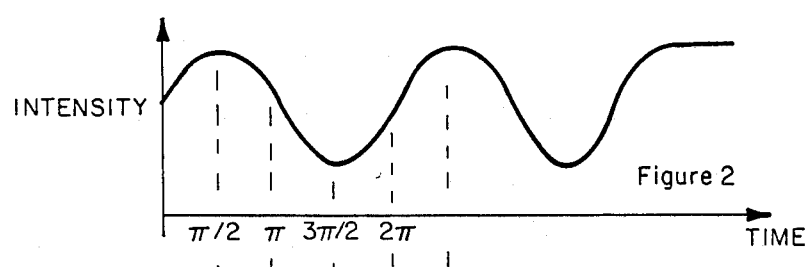
FIG. 2 is a graphical representation of the variation over time of the intensity of the light from the interferometer reflected by the semiconductor body of FIG. 1 during etching.

FIG. 2 is a plot of the waveform of the output signal produced by the detector 24 during etching, as recorded by the strip chart recorder 26. From that figure, it can be seen that during etching, the waveform of the output signal of the detector 24 of FIG. 1 approximates a sinusoid, the minima and maxima of which correspond to the periodic minima and maxima, respectively, of the composite intensity of the beams. The instantaneous frequency f of this sinusoid is proportional to the instantaneous rate at which the light transmissive layer 14 is being etched. The etch rate may be expressed mathematically as $$\text{Etch rate} = \lambda/(2n) \cdot f \quad (1)$$

where $\lambda$ is the wavelength of the laser beam 21 and n is the index of refraction of the light transmissive layer 14.

The sinusoid of FIG. 2 also yields information about the cumulative amount of material that has been removed thus far from the light transmissive layer 14. By counting the number of cycles in the sinusoid, the depth of the etch can be determined. Mathematically, the depth of the etch can be expressed by the relationship as $$\text{Etch depth} = \lambda/(2n) \, (\text{\# of cycles}) \quad (2)$$

From the sinusoid of FIG. 2, which represents the variation in the intensity of the beams over time, the operator can manually calculate the etching process parameters using equations (1) and (2) above. However, manual calculation of the etching process parameters is prone to error. In facilities where a large number of semiconductor wafers 10 are undergoing etching simultaneously, the time spent by the operator to manually determine the etch rate and etch depth is likely to be significant, thus delaying or even preventing him or her from performing other tasks in a timely fashion.

Figure 3:
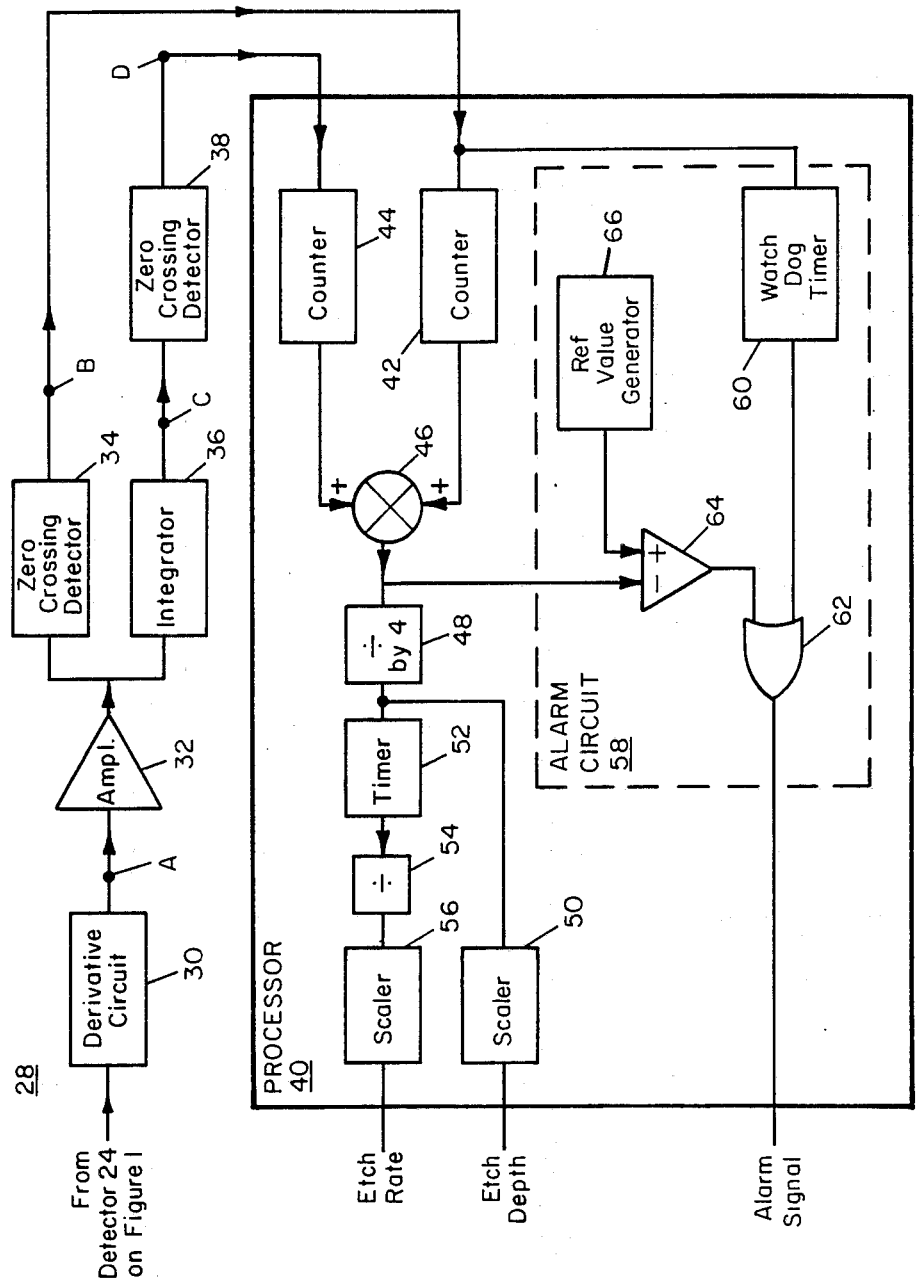
FIG. 3 is a block diagram of a counter circuit in accordance with the present invention for use with the interferometer of FIG. 1 for automatically measuring the semiconductor etching process parameters.

FIG. 3 shows a block diagram of a counter circuit 28, in accordance with the present invention, for automatically determining semiconductor etching process parameters from the output signal of the detector 24 of FIG. 1. The counter circuit 28 includes a derivative circuit 30 whose input is coupled to the output of the detector 24 of FIG. 1. The output signal of the derivative circuit 30 is supplied to an amplifier 32 for distribution to a zero crossing detector 34 and to an integrator 36. A second zero crossing detector 38 has its input coupled to the output of the integrator 36. The output signal of each of the zero crossing detectors 34 and 38, which changes in state in response to the zero crossings of the input signal supplied thereto, is supplied to a processor 40.

The processor 40 includes a pair of counters 42 and 44, each coupled to the output of one of the zero crossing detectors 34 and 38, respectively, so as to be triggered thereby. The output count of the counters 42 and 44 is supplied to a summing circuit 46. A divide by four gate 48 is connected to the output of the summing circuit 46 and attenuates the count supplied therefrom by a factor of ¼. A scaler 50 is coupled to the output of the divide by four gate 48 and scales count supplied therefrom by the factor $\lambda/2n$.

The output count of the divide by four gate 48 is also supplied to the input of a timer 52 which is triggered upon a binary "one" count received therefrom. A divide circuit 54 is coupled to the output of the timer 52 and generates an output count whose value equals the mathematical inverse of the value of the count supplied thereto from the timer. The output count of the divide circuit 54 is supplied to a scaler 56. The scaler 56 operates to scale the input count supplied thereto from the divide circuit 54 by the factor $\lambda/2n$.

The processor 40 also includes an alarm circuit 58 which is provided with a watchdog timer 60 coupled to the output of the zero crossing detector 34. The timer 60 produces a digital signal that changes state from a logic "low" to a logic "high" level when the output signal of the zero crossing detector 34 fails to undergo a change in state within a predetermined time period. The output signal of the watchdog timer circuit 60 is coupled to the first input of an OR gate 62. The second input of the OR gate 62 is supplied with the output signal of a comparator 64 whose invert input is connected to the output of the summing circuit 46. A reference signal generator 66, which provides an operator-adjustable output count indicative of the number of quarter cycles of the output signal of the detector 24 of FIG. 1 that pass during etching before a predetermined depth is reached, is coupled to the non-invert input of the comparator 64.

Figure 4:
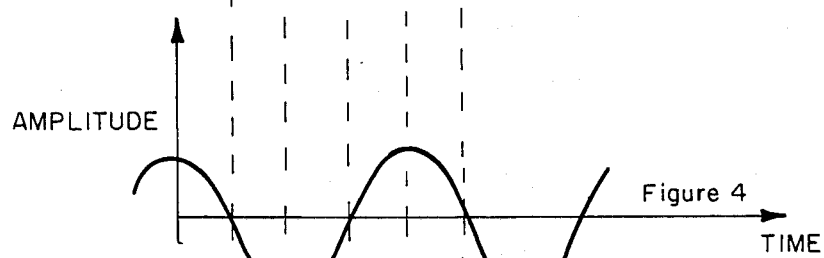
FIGS. 4, 5, 6 and 7 are graphical representations of the signal produced at each of the nodes A, B, C and D, respectively, of the counter circuit of FIG. 3 during the operation thereof.

The operation of the counter circuit 28 will now be described by reference to FIGS. 2 and 4–7. As indicated previously, during etching of the light transmissive layer 14 of FIG. 1, the composite intensity of the beams exhibits periodic minima and maxima, causing the waveform of the output signal of detector 24 of FIG. 1, which is represented graphically in FIG. 2, to appear as a sinusoid. The derivative circuit 30 of FIG. 3 produces a signal at its output (Node A) which varies as the derivative of the input signal supplied thereto from the detector 24. Since the derivative of the trigonometric function sin(t) is cos(t), the derivative circuit 30 produces a cosinusoidally varying output signal in response to the sinusoidally varying signal supplied thereto from the detector 24. The waveform of the cosinusoidally varying output signal of the derivative circuit 30 is depicted in FIG. 4. An important attribute of the waveform depicted in FIG. is that it has no offset as compared to the waveform depicted in FIG. 2.

Figure 5:
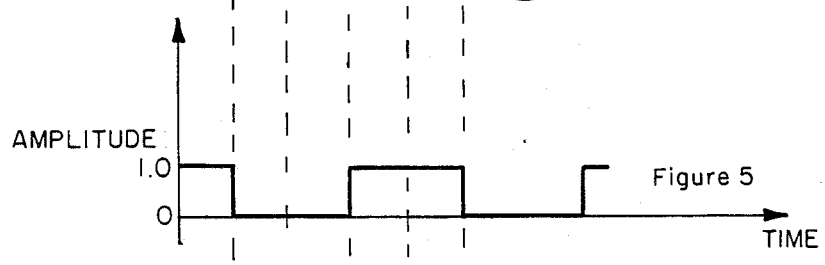

FIG. 5 represents the waveform of the digital signal produced at the output (Node B) of the zero crossing detector 34 of FIG. 3 in response to the zero crossings of the input signal supplied thereto from the derivative circuit 30. As can be seen by reference to both FIGS. 4 and 5, the waveform of FIG. 5 has a non-zero amplitude during the time interval between 0 and $\pi/2$ and during the time interval between $3\pi/2$ and $2\pi$. These time intervals correspond to first and fourth quarter cycles of the waveform of FIG. 4. During the time intervals between $\pi/2$ and $\pi$ and between $\pi$ and $3\pi/2$, corresponding to the second and third cycles of the waveform of FIG. 4, the waveform of FIG. 5 has a zero amplitude. Referring now to FIGS. 2 and 5, the output signal of the zero crossing detector 34 whose waveform is depicted in FIG. 5, can be seen to change in state in response to a maxima or minima of the sinusoid of FIG. 2, representing the waveform of the output signal of the detector 24.

Figure 6:
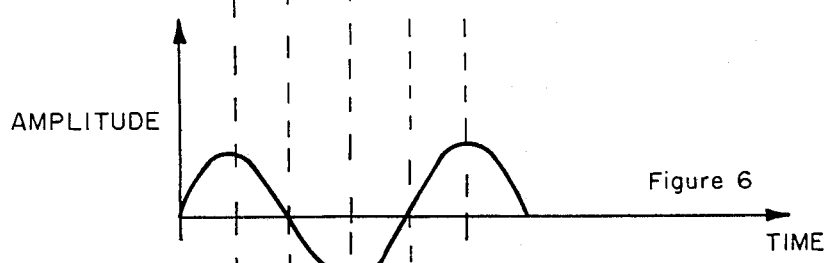

Turning now to FIG. 6, there is shown a graphical representation of the waveform of the signal produced at the output (Node C) of the integrator 36 of FIG. 3. The integrator 36 serves to integrate the cosinusoidally varying input signal supplied thereto from the derivative circuit 30. Since the integral of the function cos(t) is sin(t), the waveform of FIG. 6 is sinusoidal and is in phase with the sinusoidal waveform of FIG. 2. However, as compared to FIG. 2, the waveform of FIG. 6 is not offset.

Figure 7:
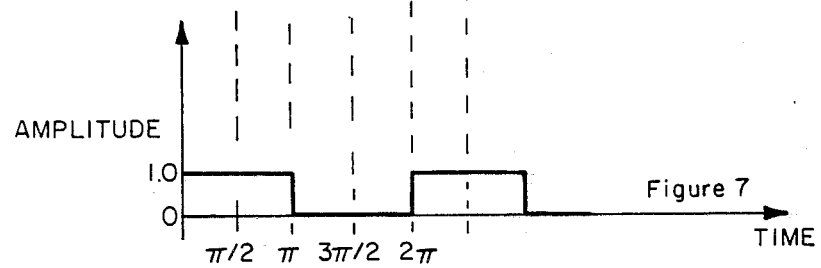

The zero crossing detector 38 of FIG. 3 is responsive to the zero crossings of the output signal of the integrator 36. When supplied with a sinusoidally varying input signal from the integrator 36, the zero crossing detector 38 produces a digital signal at its output (Node D) whose waveform is illustrated in FIG. 7. The waveform of FIG. 7 has a non-zero amplitude during the time interval between 0 and $\pi/2$ and between $\pi/2$ and $\pi$, corresponding to the first and second cycles of the waveform of FIG. 6. The waveform of FIG. 7 has a zero amplitude during the time intervals $\pi$ and $3\pi/2$ and $3\pi/2$ and $2\pi$, corresponding to the third and fourth quarter cycles, respectively, of the waveform of FIG. 6. In comparison to the waveform depicted in FIG. 5, which represents the output signal of the zero crossing detector 34, the waveform of FIG. 7, representing the output signal of the zero crossing detector 38, is phase shifted 90° therefrom.

The output signals of the zero crossing detectors 34 and 38 provide information about the number of cycles, and the frequency of the sinusoid of FIG. 2, representing the variation in the composite intensity of the beams over time during etching of the semiconductor body 10 of FIG. 1. During each quarter cycle of the sinusoid of FIG. 2, the output signal of one or the other of the zero crossing detectors 34 and 38, changes state, as indicated by the waveforms depicted in FIGS. 5 and 7, respectively. The combined count of the number of changes in state of the output signal of each of the zero crossing detectors 34 and 38 is thus representative of the total number of quarter cycles of the sinusoid of FIG. 2 that have passed so far. One quarter of this combined count represents the total number of whole cycles of the sinusoid of FIG. 2 and represents the number of minima or maxima of the intensity of the reflected, interfering beams $R_1$ and $R_2$.

Returning to FIG. 3, each of counters 42 and 44 of the processor 40 counts the transitions in amplitude of the output signal of one of the zero crossing detectors 34 and 38, respectively. The combined count of the counters 42 and 44, as obtained by the summing circuit 46, thus represents the total number of quarter cycles of the sinusoid depicted in FIG. 2 that have passed thus far. The output count of the divide by four gate 48, which represents one quarter of the count generated by the summing circuit 46, is therefore indicative of the whole number of cycles that have passed. The scaler 50 operates to scale the output count of the divide by four gate 48 by the value $\lambda/2n$ to yield an output count in accordance with equation (1) which is indicative of the etch depth.

The etch rate is obtained from the output count of the divide by four gate 48 as follows. The timer 52 operates to count the time between successive occurrences of a "one" count produced by divide by four gate 48, and thus measures the period of each successive cycle of the sinusoid of FIG. 2. The divide gate 54, which is supplied with the output count of the timer 52, provides an output count representative of the mathematical inverse of the period of the sinusoid. The inverse of the period of the sinusoid of FIG. 2 is its frequency. The scaler 56 scales the output count of the divide gate 54 by 37 the factor $\lambda/2n$ to yield a count in accordance with equation (2) which is representative of the average etch rate over each cycle.

In operation, the alarm circuit 58 of FIG. 2 produces an alarm signal at the output of the OR gate 62 when either a predetermined etch depth has been reached or when etching has been completed. The comparator 64 of the alarm circuit 50 produces a logic "high" signal when the count of summing circuit 46, representing the total number of quarter cycles in the sinusoid of FIG. 2 that have passed thus far, equals or exceeds the output count of the reference value generator 66, which represents a number of quarter cycles which pass before reaching a prescribed etch depth. Thus, the output signal of the comparator 64 goes "high" when the predetermined etch depth has been reached, causing the OR gate 62 to generate an alarm signal in response thereto.

The watchdog timer 60 of the alarm circuit 58 monitors the completion of the etching process. Once etching of the light transmissive layer 14 has been completed, there is no longer any interference between the coincident reflected beams because there is no longer any path length difference therebetween. Hence, the beams merge. Thus at the completion of etching, the intensity of the reflected beams ceases to vary over time. The output signal of the detector 24 now becomes constant in amplitude and no longer exhibits any zero crossings so that both the zero crossing detectors 34 and 38 also now produce an output signal which is amplitude invariant. When the output signal of the zero crossing detector 34 fails to change state within a set time, as occurs at the completion of the etching process, then the watchdog timer 60 generates a logic "high" signal. In response to the logic "high" signal at the output of the watchdog timer 60, the OR gate 62 produces an alarm signal.

There are several advantages to constructing the counter circuit 28 of FIG. 3 in the manner described above. The two zero crossing detectors 34 and 38 of the counter circuit 28 determine the number of quarter cycles of the sinusoid of FIG. 2 and therefore allow the etch rate and etch depth to be accurately determined regardless of which quarter cycle of the sinusoid was used as a starting point. In contrast, the use of single zero crossing detector would require starting at a particular quarter cycle of the sinusoid of FIG. 2 to insure accurate results. Further, the derivative circuit 30 and the integrator 36, which supply the zero crossing detectors 34 and 38 with the derivative and the integral of the derivative, respectively, of the output signal of the detector 24, effectively remove any offset in the signal supplied from the detector 24 to each of the zero crossing detectors 34 and 35. The offset in the output signal of the detector 24 may be thought of as a mathematical constant which is reduced to zero upon differentiation thereof. Removing the offset in the input signal supplied to the zero crossing detectors 34 and 34 improves the accuracy of the determination of the number of sinusoid cycles, thus permitting more accurate calculation of the etching process parameters.

The processor 40, which has been described above as comprising a plurality of dedicated circuit elements, can, instead, be comprised of a microprocessor (not shown). The microprocessor would be programmed to process the output signals of the zero crossing detectors 34 and 38 to determine the number of cycles and the frequency of the sinusoid of FIG. 2. From this data, the etch rate and the etch depth would be automatically computed in accordance with equations (1) and (2), respectively. Detection of the completion of the etching process or when a predetermined etch depth has been reached could also be accomplished by the microprocessor instead of the alarm circuit 58.

It is to be understood that the embodiments described herein are merely illustrative of the principles of the invention. Various modifications and changes may be made thereto by persons skilled in the art which will embody the principles of the invention and fall within the spirit and scope thereof.

What is claimed is:

1. A method for automatically measuring the depth and rate of etching of an article, comprising the steps of:
    (a) directing light towards the article, formed of a substrate having an overlying light transmissive layer, to cause a first beam of light to be reflected from the substrate and a second, conincident beam to be reflected from the light transmidsive layer, the coincident, reflected beams interfering because of a path length difference therebetween, causing the composite intensity of the beams to exhibit periodic maxima and minima as the path length difference changes during etching of said light transmissive layer;
    (b) detecting the composite intensity of the beams during etching;
    (c) generating a first electrical signal, which changes in state in response to a minima or maxima of the composite intensity, and generating a second electrical signal which is phase shifted from the first electrical signal by 90°;
    (d) processing said first and second electrical signals to obtain a count of the number of maxima or minima of the composite intensity;
    (e) timing the period between successive changes in the count of minima or maxima and inverting the value of the period to establish the frequency of the maxima or minima; and
    (f) computing the etch depth and the etch rate in accordance with the number of maxima or minima, and the frequency, respectively, of the composite intensity.

2. The method according to claim 1 wherein the step of generating said first electrical signal includes the substeps of:
    (a) obtaining the derivative of the intensity of the reflected interfering beams; and
    (b) producing an electrical signal which changes state in response to the zero crossings of the derivative of the intensity of the reflected intefering beam.

3. The method according to claim 2 wherein the step of generating said second electrical signal includes the substeps of:
    (a) obtaining the integral of the derivative of the intensity of the reflected interfering beams; and
    (b) producing an electrical signal which changes state in response to the zero crossings of the integral of the derivative of the intensity of the reflected interfering beams.

4. The method according to claim 1 wherein the step of processing said first and second electrical signals comprises the substeps of:
    (a) counting the combined number of times each of the first and second electrical signals change in state;
    (b) dividing the combined count of the number of changes in state of the first and second electrical signals by four to yield a count representative of the number of maxima or minima in the intensity of the reflected interfering beams.

5. The method according to claim 4 wherein the step of computing said etch depth and etch rate comprises:
    scaling the frequency by the factor $\lambda/2n$ where $\lambda$ is the wavelength of the light directed towards the semiconductor body and n is the index of refraction of that portion of the light transmissive layer undergoing etching to provide an indication of the etch rate; and
    scaling the count by the factor $\lambda/2n$ to yield an indication of the etch depth.

6. An appartatus for automatically measuring the depth and rate of etching of an article comprising:
    means for directing a beam of light towards the article, formed of a substrate having a light transmissive layer, causing a first beam to be reflected from the light transmissive layer and a second coincident beam to be reflected from the substrate therebeneath, the beams interfering because of a path length difference therebetween, causing the composite intensity of the reflected interfering beams to exhibit periodic maxima and minima as the path length difference changes during etching of the light transmissive layer;

means for detecting the composite intensity of the reflected interfering beams during etching and for providing an output signal which varies accordingly;

means coupled to said detecting means and being responsive to the output signal thereof for generating first and second electrical signals, said first electrical signal changing in state in response to a minima or maxima of the composite intensity of the beams and said second electrical signal being phase shifted 90° from said first electrical signal;

means for processing said first and second signal to obtain a count of the number of minima or maxima of the composite intensity;

means for timing the period between successive changes in the count of the minima or maxima and inverting the value thereof to establish the frequency of the minima or maxima; and means for computing the depth and rate of etching of the article in accordance with the count of the number of minima or maxima and the frequency thereof, respectively.

7. The invention according to claim 6 wherein said means for directing a beam of light towards the semiconductor body comprises a helium-neon laser.

8. The invention according to claim 6 wherein said means for generating said first and second electrical signals comprises:

derivative circuit means coupled to said detecting means for providing an output signal which varies in accordance with the derivative of the output signal of said detecting means;

amplifier means coupled to said derivative circuit means for distributing the output signal thereof;

first zero crossing detector means coupled to said amplifier means for generating the first electrical signal in accordance with the zero crossings of the output signal of said derivative circuit means;

integrator means coupled to said amplifier means for providing an output signal varying in accordance with the integral of the output signal of said derivative circuit means; and second zero crossing detector means coupled to said integrator means for generating the second electrical signal in accordance with zero crossings of the output signal of said integrator means.

9. The invention according to claim 6 wherein said processing means comprises:

first counter means for counting the number of changes in state of the first electrical signal;

second counter means for counting the number of changes in state of the second electrical signal;

summing means for summing the counts of said first and second counter means; and divide by four gate means coupled to said summing means for dividing the summed count of said first and second counters by four to yield a cycle count representative of the number of whole cycles of the output signal of said detecting means that have passed thus far.

10. The invention according to claim 9 further including alarm circuit means for signaling when either a predetermined etch depth has been reached or when etching has been completed.

11. The invention according to claim 10 wherein said alarm circuit comprises:

a reference value generator for generating a count indicative of the number of quarter cycles of the output signal of the detecting means that pass before reaching a predetermined etch depth;

a comparator having a non-invert input coupled to the output of said reference value generator and having an invert input coupled to the output of said summing means, said comparator producing an output signal which changes in amplitude to a high logic level when the count at the invert input exceeds the count at the non-invert input;

a watchdog timer circuit coupled to the output of said first zero crossing detector means for generating an output signal which changes in amplitude to a high logic level when the output signal of said first zero crossing detector means fails to undergo a change in state within a predetermined time; and a logic gate having first and second inputs coupled to the output of said comparator and the output of said watchdog timer circuit, respectively, said logic gate generating an alarm signal at its output when the signal at either of its first or second inputs changes in amplitude to a high logic level.

12. A method for automatically measuring the rate and depth of etching of an article comprising the steps of:

directing light towards the article, formed of a substrate having an overlying light transmissive layer, to cause a first beam of light to be reflected from the substrate and a second, coincident beam to be reflected from the light transmissive layer thereabove, the coincident reflected beams interfering because of a path length difference therebetween causing the composite intensity of the beams to exhibit periodic maxima and minima as the path length changes during etching of the light transmissive layer;

detecting the composite intensity of the reflected beams during etching;

obtaining the derivative of the composite intensity and generating a first electrical signal which changes state in response to the zero-crossing of the derivative of the composite intensity;

obtaining the integral of the derivative of the composite intensity and producing a second electrical signal which changes state in response to the zero-crossing of the integral of the derivative of the composite intensity;

processing the first and second signals to obtain a count of the number of minima or maxima of the composite intensity;

timing the period between successive changes in the count of the minima or maxima and inverting the value of the period to establish the frequency of the mizima or minima; and computing the etch rate and depth in accordance with the number of minima or maxima and the frequency, respectively, of the composite intensity.

13. The method according to claim 12 wherein the step of processing said first and second electrical signals comprises the steps of:

counting the combined number of times each of said first and second signals change in state;

dividing the combined count of the number of changes in state of said first and second signals by four to yield a count representative of the number of minima or maxima in the composite intensity.

14. The method according to claim 12 wherein the step of computing the etch rate and depth comprises the steps of:

scaling the frequency by the factor $\lambda/2n$ where $\lambda$ is the wavelength of light directed towards the article and n is the index of refraction of the light transmissive layer undergoing etching to provide an indication of the etch rate; and scaling the count by the factor $\lambda/2n$ to yield an indication of the etch depth.

* * * * *